United States Patent [19]

Lauffer et al.

[11] Patent Number: 4,763,963

[45] Date of Patent: Aug. 16, 1988

[54] SKEWED SERPENTINE MULTI-PACKAGE PRODUCT STORAGE RACK

[75] Inventors: Scott C. Lauffer, Atlanta; Frank B. Golley, Decatur; Don S. Summerville, Snellville, all of Ga.

[73] Assignee: The Coca-Cola Company, Atlanta, Ga.

[21] Appl. No.: 889,494

[22] Filed: Jul. 25, 1986

[51] Int. Cl.[4] .............................................. B65G 59/00

[52] U.S. Cl. ......................................... 312/45; 221/67; 221/281

[58] Field of Search ................. 221/67, 281; 211/59.2, 211/74; 312/45, 42, 311

[56] References Cited

U.S. PATENT DOCUMENTS

| | | | |
|---|---|---|---|
| 2,315,515 | 4/1943 | Gibson et al. | 211/59.2 X |
| 2,758,904 | 8/1956 | Hansell et al. | 312/311 X |
| 3,110,417 | 11/1963 | Wingate et al. . | |
| 3,125,244 | 3/1964 | Holstein | 221/281 X |
| 3,498,497 | 3/1970 | Baxendale et al. . | |
| 4,235,351 | 11/1980 | Kolbl et al. . | |
| 4,245,755 | 1/1981 | Craven et al. . | |
| 4,287,992 | 9/1981 | Takemori | 211/59.2 |
| 4,561,564 | 12/1985 | Negishi . | |

*Primary Examiner*—Joseph Falk

*Attorney, Agent, or Firm*—Birch, Stewart, Kolasch & Birch

[57] ABSTRACT

A storage rack assembly and vending channel structure for a vending machine that stores packages such as bottles and cans and feeds the same to a release mechanism upon the insertion of one or more coins or tokens in payment for the article. A release mechanism allows the product to travel down a vend chute and into a delivery port. Each channel is comprised of a pair of mutually opposing serpentine side members having a predetermined separation distance providing a storage column for both bottles and cans. The support surfaces of both members comprise side walls which are furthermore skewed or inclined from the horizontal downwardly. A rear support surface comprising a back wall and/or a serpentine guide bar is also provided so the package, whether it be a bottle or can or both is guided by its side and base rather than by its end or side only, thus providing compatibility with various types of packages including reduced neck bottles and cans which will not normally feed properly through conventional serpentine mechanisms.

7 Claims, 6 Drawing Sheets

SKEWED SERPENTINE MULTI-PACKAGE PRODUCT STORAGE RACK

BACKGROUND OF THE INVENTION

The present invention relates to a space-to-sales vend apparatus for a vending machine that stores soft drink bottles and cans and feeds the same to a release mechanism at the bottom of each apparatus. More specifically, the present invention relates to a non-jamming storage rack which is compatible with various types of bottles and cans.

Serpentine product storage racks are generally known and have been used in various conventional vending machine designs. A typical serpentine storage rack is comprised of "S" shaped storage channels for storing and dispensing horizontally oriented cylindrical packages. These storage channels are normally located in a vending machine housing and guide the packages either by their ends or by the cylindrical portion of the package. The packages are loaded into the racks at the top whereupon they proceed to travel down a curved path to fill each channel. Such apparatus has certain advantages due to the fact that these types of vending machines can be designed to include low cost cast steel, wire or sheet metal racks and a low cost product release mechanism. Certain inherent disadvantages nevertheless exist with such designs inasmuch as they include inefficient storage space utilization, incompatibility with non-cylindrical cans, incompatibility with bottles and difficult blind loading. Moreover, such apparatus is subject to constant jamming and difficult servicing as a result thereof.

While the concept of a skewed vend channel suitable for vending stacked columns of bottles is broadly known, having been disclosed, for example, in U.S. Pat. No. 2,338,715, issued to L. O. Garner, such a structure has not been heretofore utilized in a serpentine type of channel of the type to be hereinafter described.

SUMMARY OF THE INVENTION

Accordingly, it is the primary object of the present invention to provide an improvement in vend racks for vending machines.

It is a further object of the present invention to provide a universal type of multi-package product storage rack assembly and vend channel which is compatible with diverse types of packages.

It is another object of the present invention to provide a vend channel which permits changing package size and type without adjustments to the apparatus.

It is still another object of the present invention to provide a vend channel which is compatible with reduced neck packages which will not normally feed through conventional serpentine storage racks.

It is yet another object of the present invention to provide a vend channel which permits the package to be guided by the size and base of the package rather than by the ends or side only.

It is yet a further object of the invention to provide a storage rack and vending channel assembly which permits package loading from bottom to top of the channel.

The objects of the present invention are fulfilled by providing a storage rack assembly for delivering packages such as cans and bottles to a release mechanism in a vending machine. A vend chute then delivers packages from the release mechanism to a pick-up site such as an access port in the face of a vending machine. The storage rack comprises a pair of mutually opposing serpentine members having a predetermined separation distance which defines a serpentine channel for storing bottles and cans. These wall surfaces are furthermore skewed or inclined downwardly from the horizontal of the storage rack. A support member is also provided so that the package, whether it be a can or bottle or both, is guided by its side and base rather than by its ends or only its side.

One or more vertically oriented serpentine vend channels in accordance with the present invention are arranged side by side in parallel relationship and in one embodiment may be disposed in a track mounted slide mechanism which permits the entire assembly to be pulled away from the body of the vending machine for permitting easy access and loading of the respective racks.

BRIEF DESCRIPTION OF THE DRAWINGS

The object of the present invention and the attendant advantages thereof will become more readily apparent by reference to the following drawings wherein like numerals refer to like parts, and wherein.

DETAILED DESCRIPTION OF THE PREFERRED EMBODIMENTS

Figure 2:
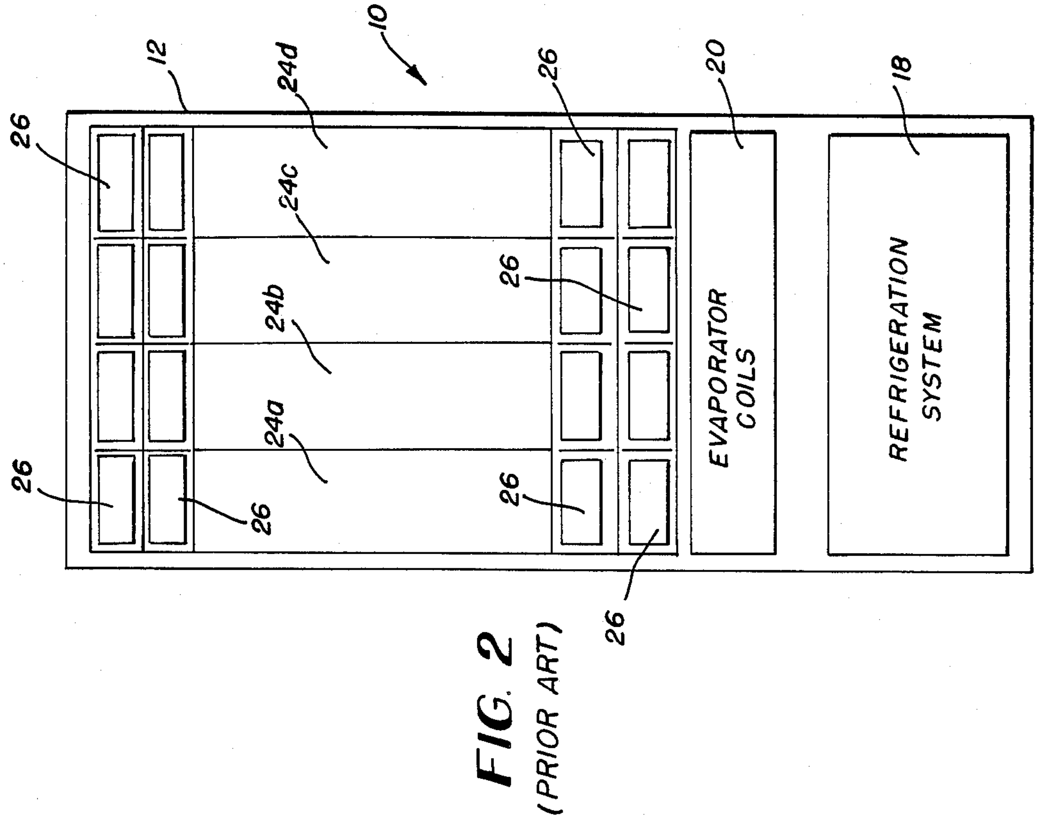
FIG. 2 (PRIOR ART)
FIG. 2 is a diagrammatic front elevational view of the apparatus shown in FIG. 1 taken along the lines 2—2 thereof.
Figure 1:
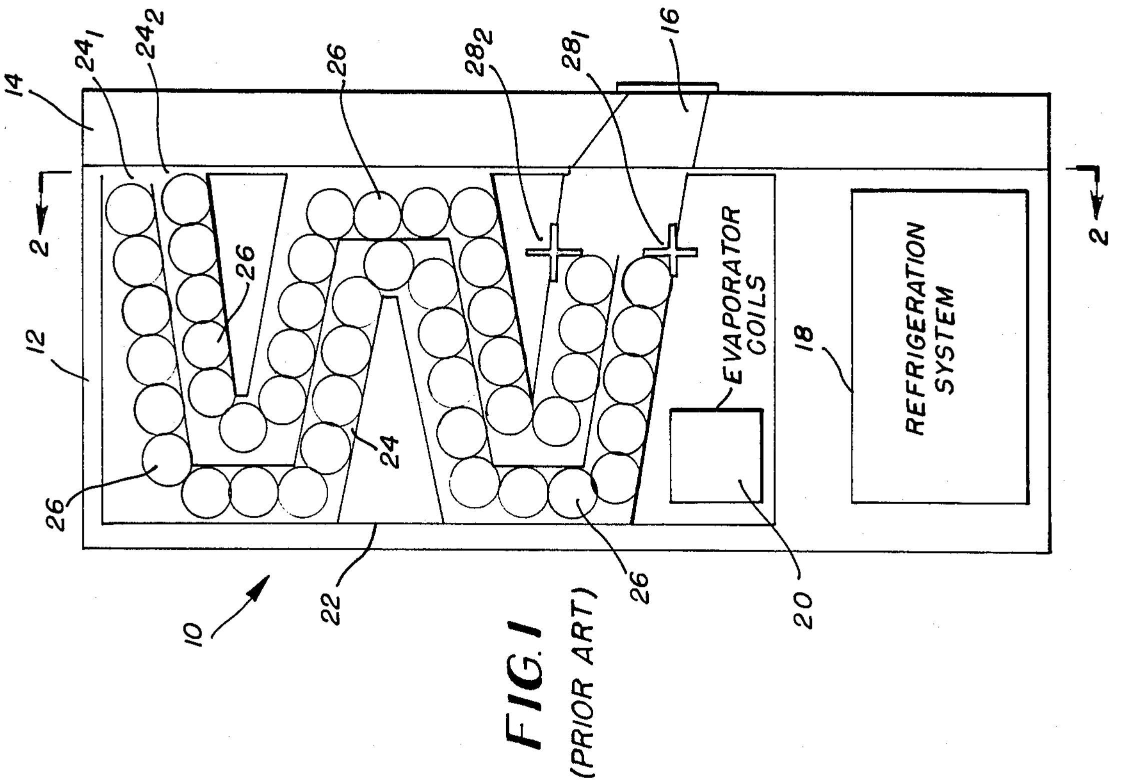
FIG. 1 (PRIOR ART)
FIG. 1 is a mechanical diagrammatic illustration of a side elevational central cross sectional view of a conventional vending machine including a serpentine "S" shaped storage rack in accordance with the known prior art.

Referring now to the drawings and more particularly to FIG. 1, reference numeral 10 denotes a conventional vending machine for dispensing packages, such as bottles and cans, to a customer upon the insertion of one or more coins into a coin slot, not shown. The vending machine 10 as shown in comprised of an upright cabinet or housing 12 to which is attached a hinged door 14 and which includes, among other things, an dispensing port 16 for dispensing packages to a customer from the cabinet 12. Further as shown in FIG. 1, the vending machine 10 typically includes a refrigeration system 18 in the lower portion of the cabinet which is coupled to a set of evaporator coils 20 located in an upper compartment 22 containing a plurality of "S" shaped serpentine storage and vend channels 24 which are adapted to contain and guide like shaped packages downwardly past a release mechanism 28 to a vend chute and then to the dispensing port 16. Further as shown in FIG. 2, the serpentine vend channels are typically arranged in juxtaposed vertical columns $24_a$, $24_b$, $24_c$ and $24_d$, with each column containing one or more like metal chutes $24_1$ and $24_2$, as shown in FIG. 1, which feed a respective single line of horizontally oriented cylindrical packages 26 past the respective release mechanisms $28_1$, $28_2$ through the vend chute to a common point, i.e. the dispensing port 16.

Figure 3A:
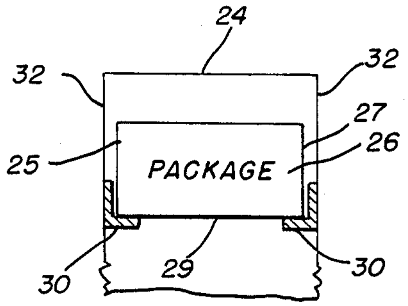
FIG. 3A (PRIOR ART)
FIGS. 3A and 3B are diagrammatic illustrations of packages being guided in accordance with known prior art practice.
Figure 3B:
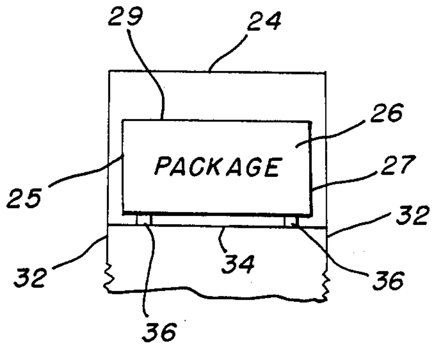
FIG. 3B (PRIOR ART)

Referring now to FIGS. 3A and 3B, the "S" shaped storage racks 24 furthermore are typically designed to guide horizontally oriented cylindrical packages 26 loaded therein either by their ends 25 and 27 (FIG. 3A) or by the cylindrical portion 29 of the package (FIG. 3B). When the packages 26 are guided by their ends 25, 27, the storage rack typically contains bracket type elements 30 which are secured to the side walls 32 while when the package 26 is guided by the cylindrical package area 29, the storage rack contains a bottom wall 34 spanning the side walls 32 and containing one or more elevating or offsetting guide means 36 arranged along the length of the rack 24.

Figure 4:
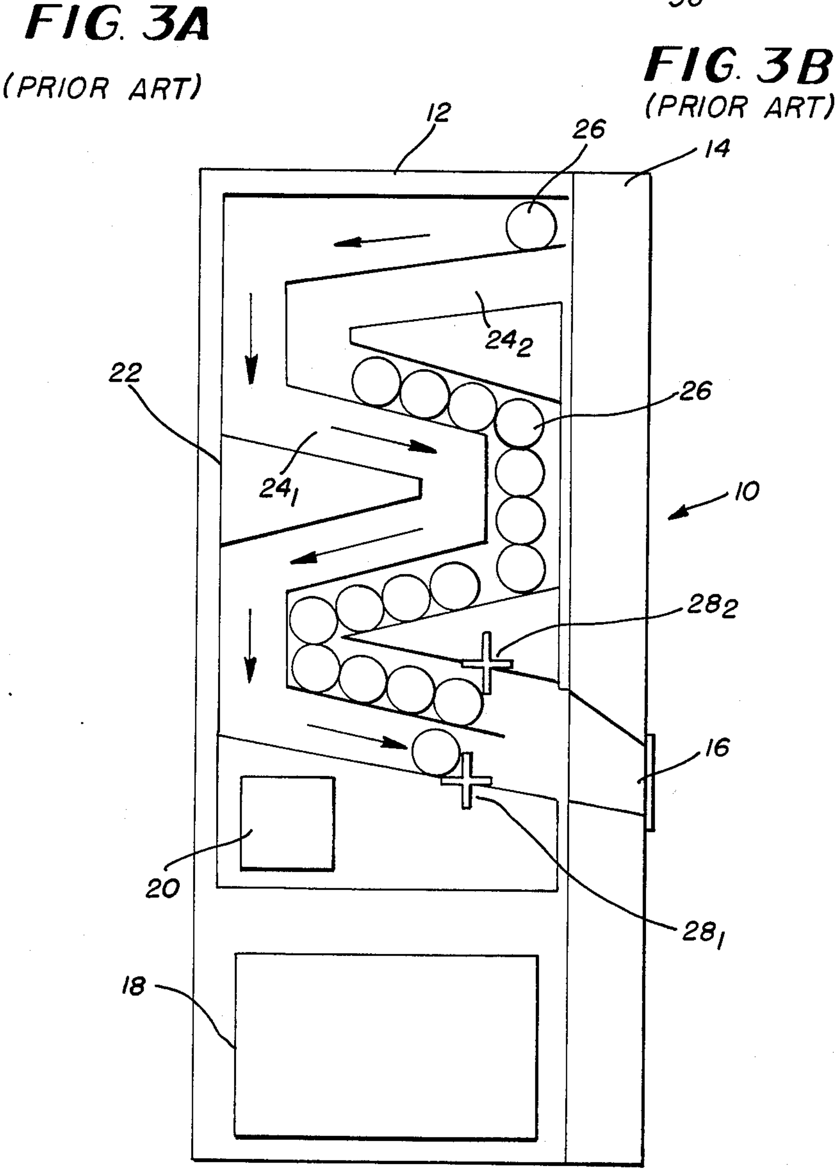
FIG. 4 (PRIOR ART)
FIG. 4 is a mechanical diagrammatic illustration of the manner in which packages are loaded from top to bottom in the vending machine shown in FIG. 1.

Referring briefly now to FIG. 4, shown therein is the manner in which prior art vending machines including conventional "S" shaped serpentine storage and vend channels, as shown in FIG. 1, are loaded. As shown, packages 26 comprising, for example, horizontally oriented cans are inserted into the channels $24_1$, $24_2$, etc. at the top, whereupon they fall or travel under the influence of gravity down the serpentine path until they hit a release mechanism 28 or run into other packages already in place until each channel is filled. An inherent problem is built into such a structure due to the fact that the packages gain considerable velocity and momentum during their downward travel which can result not only in jamming in the chute itself, but also the packages themselves can be damaged as a result of the impact sustained at the bottom of the channel.

Figure 5A:
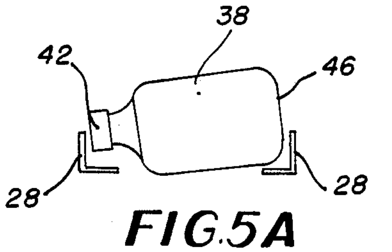
FIG.5A (PRIOR ART)
FIGS. 5A and 5B are diagrammatic illustrations of small necked packages being guided by their respective ends in accordance with known prior art practices.
Figure 5B:
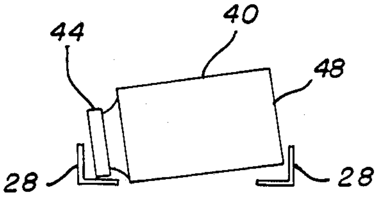
FIG. 5B (PRIOR ART)
Figure 6A:
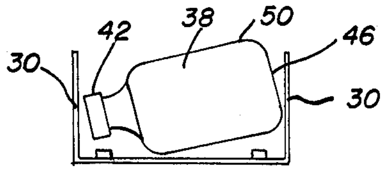
FIG. 6A (PRIOR ART)
FIGS. 6A and 6B are diagrammatic illustrations of small neck packages being guided by their respective cylindrical areas in accordance with known prior art practice.
Figure 6B:
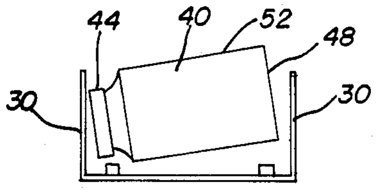
FIG. 6B (PRIOR ART)

Another attendant weakness in the operability of the foregoing prior art structure manifests itself when it is desired to feed reduced neck packages down a serpentine vending channel. With references to FIGS. 5A and 5B, reduced neck bottles 38 and reduced neck cans 40, when guided by their respective ends, tend to jam in a down feeding storage rack or vend channel, such as shown in FIG. 4, due to the fact that the respective small diameter ends 42 and 44 of the reduced neck bottle 38 and can 40 roll slower than their large ends 46 and 48. The same situation occurs when reduced neck bottles 38 and cans 40 are guided by their cylindrical area provided by the peripheries 50 and 52 of the package bodies as shown in FIGS. 6A and 6B. Package jams occur in this configuration because the small diameter ends 42 and 44 of the bottle 38 and can 40 rolls slower than the larger ends 46 and 48 or because the small end contacts the opposing side wall 30, thus causing the package to rotate and jam.

This now leads to a consideration of the present invention which is directed to a storage rack assembly including one or more skewed serpentine multi-package storage racks which allows the package to be guided by the side and base of the package rather than by its ends or side only and additionally permitting many different types of packages to be vended without the need for any mechanical adjustment. This includes various shapes and sizes of cans and bottles including reduced neck versions thereof.

Figure 7:
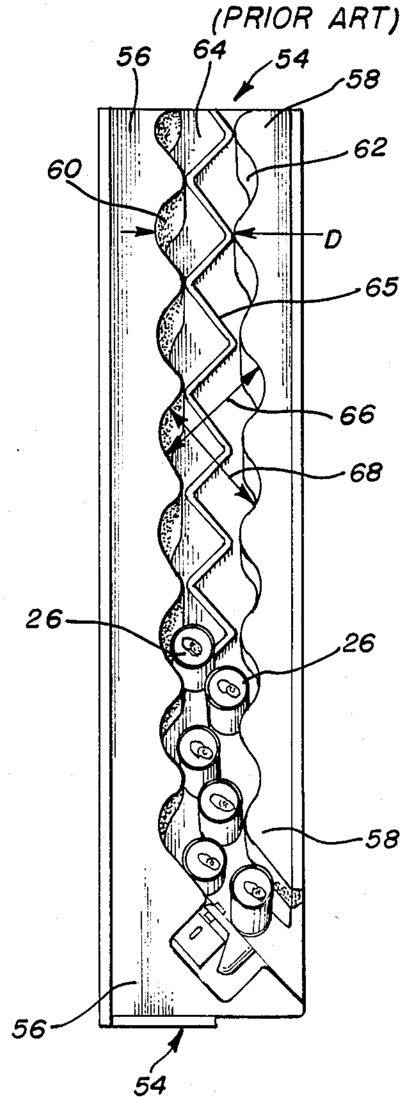
FIG. 7 is a side elevational view illustrative of the preferred embodiment of a vend channel in accordance with the subject invention.

Referring now to FIG. 7, there is shown the preferred embodiment of a new and improved serpentine vend channel 54 which is comprised of a pair of opposing serpentine side members 56 and 58 having inwardly facing side wall surfaces 60 and 62 having regular undulations. A front wall of channel 54 is open for receiving the packages to be vended during a loading procedure. A rear wall 64 opposite to the open front wall spans the side members 56 and 58 and is designed to support a serpentine guide bar member 65 on its inner surface mid-way between the side walls 60 and 62. The separation distance D and the pitch or period of the undulations in the surface wall portions furthermore are designed to provide alternately zig-zag linear path segments 66 and 68. Moreover, the linear dimensions of path segments 66 and 68 permit but two contacting packages to exist therealong in the embodiment illustrated, thus providing a double-nested vertical storage column. However, it should be understood that the path segments may be any length desired within the spirit and scope of the present invention. The side wall surfaces 60 and 62 are also skewed relative to the horizontal and are tilted downwardly from front to back toward the rear wall 64.

The two opposing side members 56 and 58 as well as the rear wall 64 can be constructed in any desired fashion but one typical example comprises an integrated structure formed by a molding process including a structural foam or blow molded resin to provide a light weight yet durable structure having smooth continuous guiding surfaces 60 and 62. The depth of the skewed serpentine channel 54 formed by the skewed wall surfaces 60 and 62 from front to back is determined by the range of package heights with which it is to be utilized. For example, the configuration shown in FIG. 7 can be dimensioned such that it will accept all twelve ounce aluminum cans, all known configurations of 12 oz. PET cans, all 10 and 16 oz. PLB glass bottles, all 16 oz. PET bottles.

Figure 8:
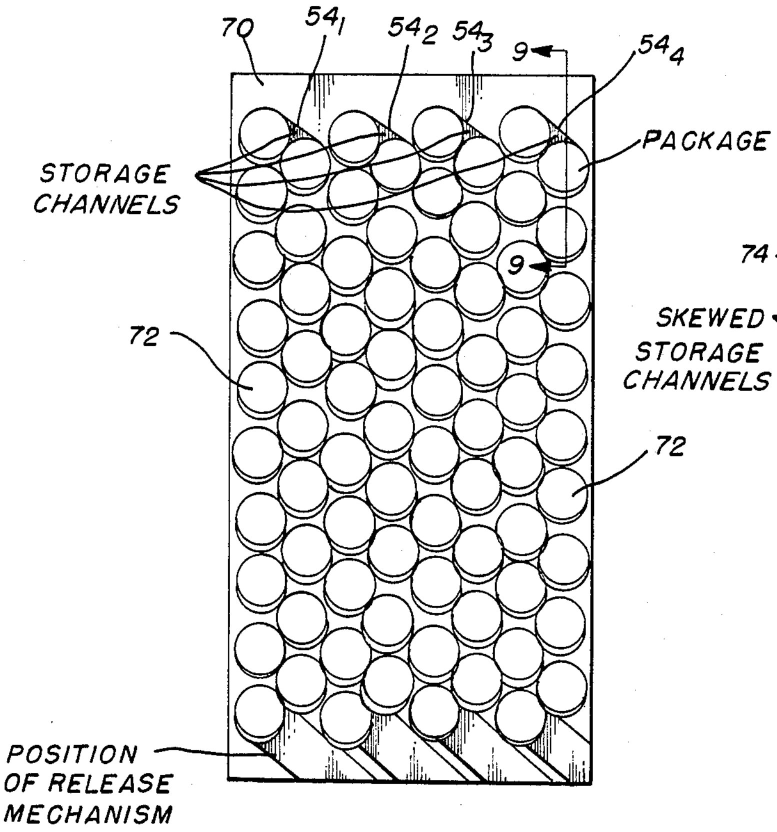
FIG. 8 is a mechanical diagram illustrative of a storage rack assembly including a plurality of serpentine vend channels shown in FIG. 7 arranged side by side to provide a plurality of substantially parallel vertical storage columns.

While a single vend channel in accordance with this invention is disclosed in FIG. 7, reference now to FIG. 8 is illustrative of a side elevational view of a plurality of juxtaposed channels forming a storage rack unit and comprises collectively a generally rectangular three dimensional molded body 70 which includes four separate storage and vending channels $54_1$, $54_2$, $54_3$ and $54_4$, thereby providing four vertically disposed and generally parallel skewed storage channels, each containing its own plurality of packages 72, be they either bottles or cans, or a mixture thereof. The storage rack of FIG. 8 may be placed in a vending machine with channel $54_1$, adjacent the rear wall of the machine and channel $54_4$ adjacent the front wall, as will become more fully apparent by reference to FIG. 11.

Figure 9:
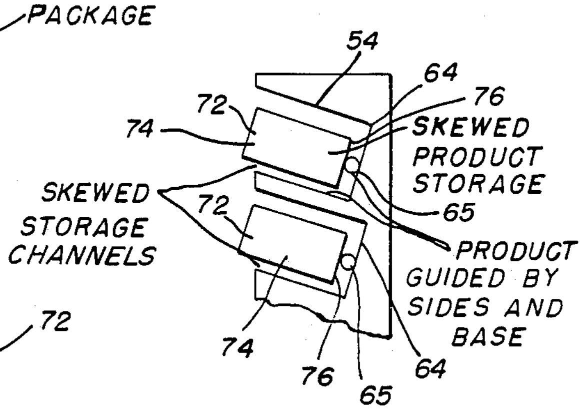
FIG. 9 is a partial sectional view of FIG. 8 taken along the lines 9—9 thereof.

FIG. 9 is intended to illustrate that each storage channel 54 is inclined from the horizontal downwardly from front to back of the channel so as to maintain the packages 72 in a likewise skewed storage position within the chute 54 so that it is guided by its side and rear surfaces 74 and 76, with the respective bottom surfaces or base 76 being held away from the back wall 64 by the guide member 65 which follows a serpentine path down the back wall as shown in FIG. 7.

Figure 10A:
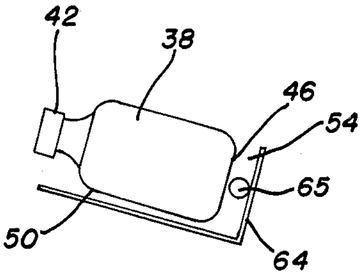
FIGS. 10A and 10B are diagrammatic illustrations of the manner in which packages are guided in accordance with the skewed orientation in the embodiment shown in FIG. 7.
Figure 10B:
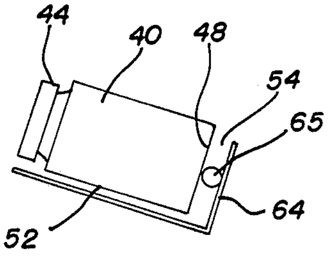

Referring now briefly to FIGS. 10A and 10B, there is illustrated the guiding or reduced neck packages comprising a bottle 38 as shown in FIG. 10A and a can 40 as shown in FIG. 10B. By means of the skewed orientation within channel 54, the cylindrical surfaces 50 and 52 of the bottle and can respectively contact and roll on the wall surfaces of the rack 54 while the bottom or base surfaces 46 and 48 of the packages rest against the guide member 65 on the rear wall 64.

Figure 11:
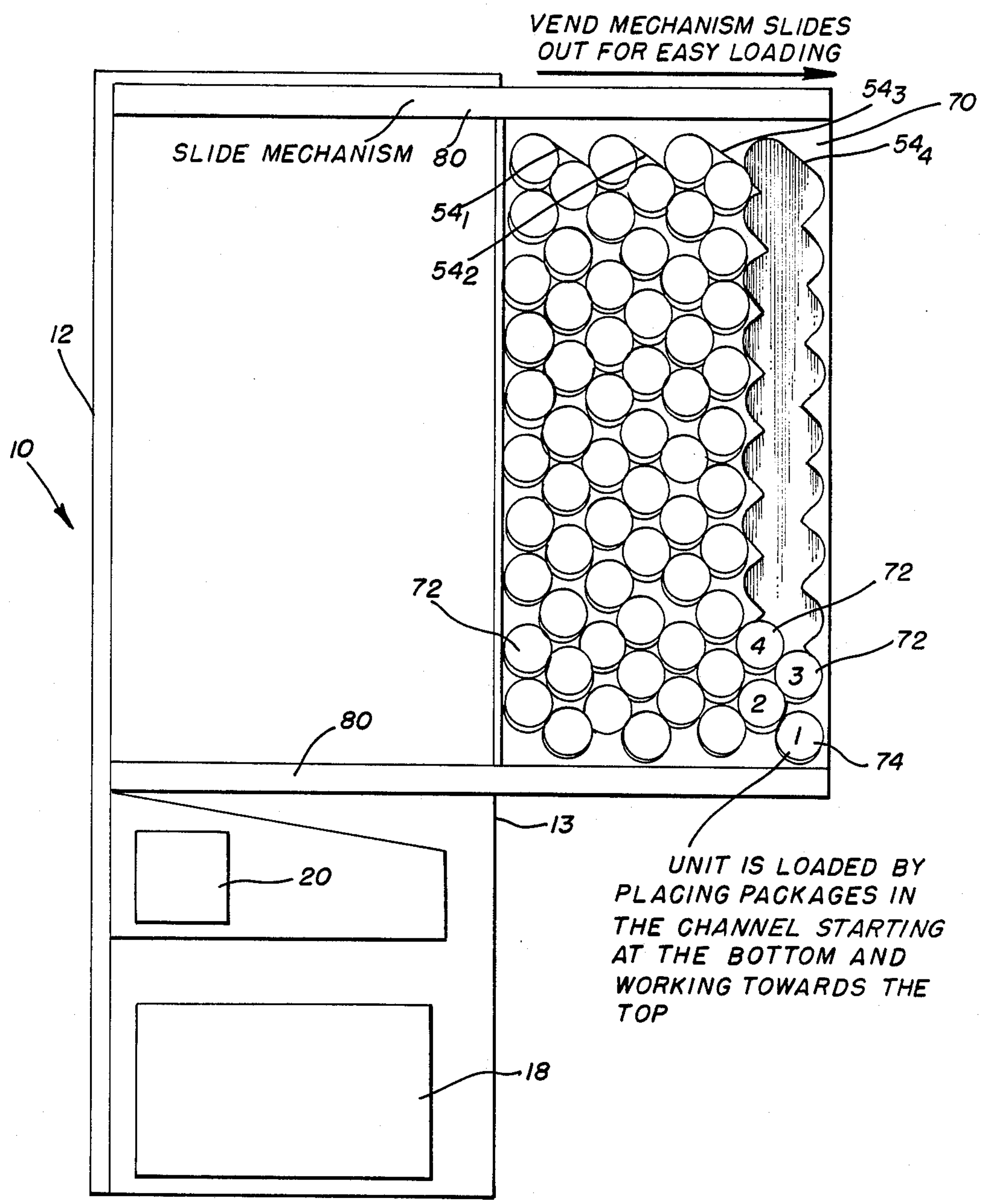
FIG. 11 is a mechanical diagrammatic illustration of a vending machine including a slide mechanism for accommodating the multi-storage rack assembly shown in FIG. 8.

Referring now to FIG. 11, another optional feature of the invention is that it permits loading outboard of the front wall of the machine. Accordingly, a multiple storage rack configuration shown in FIG. 8 and including the four skewed serpentine channels $54_1$, $54_2$, $54_3$ and $54_4$, is mounted on a pull-out slide assembly including upper and lower slide mechanisms 80 in the upper part of the vending cabinet 12. This permits each entire pull-out assembly to be partially withdrawn from the interior of the cabinet transversely to the plane of the front wall 13 when the door 14 (FIG. 1) is opened. A plurality of side-by-side pull-out slide assemblies may be provided between the side walls of the cabinet as viewed from the front wall 13. Each of these pull-out slides and associated storage racks define juxtaposed vertical columns disposed in a similar fashion to columns $24_a$, $24_b$, $24_c$ and $24_d$ illustrated in FIG. 2. As opposed to prior art assemblies wherein top loading is required, the packages 72 may be loaded by placing them in their respective vending channels, for example, $54_4$, by starting at the bottom and working to the top in the order 1, 2, 3, 4, etc. as shown in FIG. 11. This procedure is repeated for each channel of each storage rack associated with each respective pull-out slide assembly.

Figure 13:
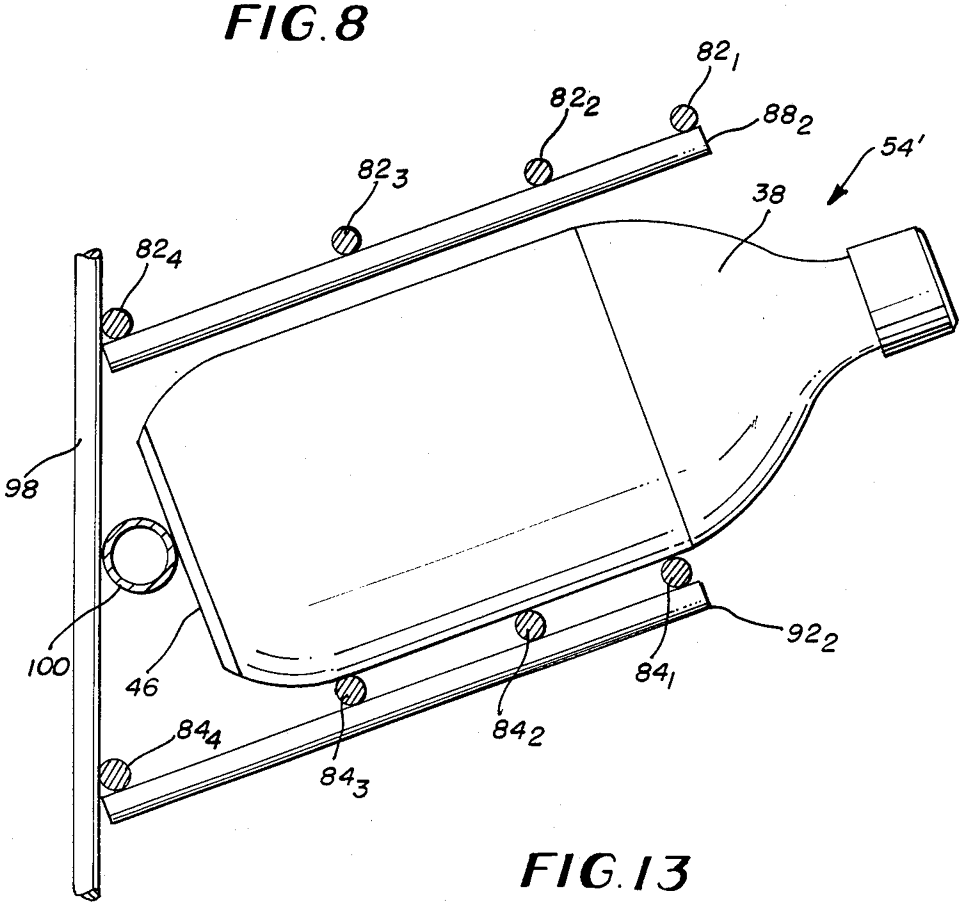
FIG. 13 is a diagrammatic partial cross sectional view of the embodiment shown in FIG. 12.
Figure 12:
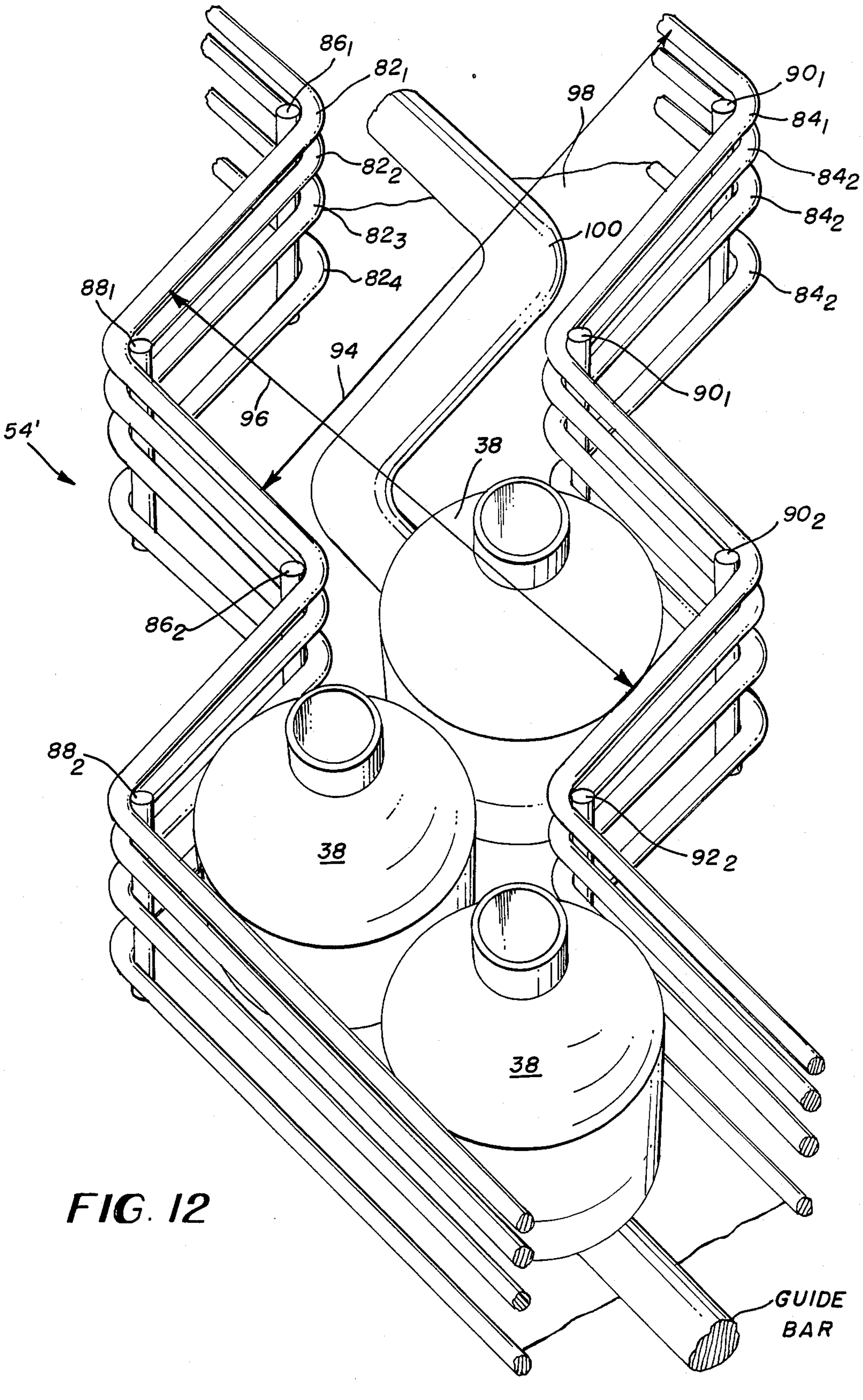
FIG. 12 is a partial perspective view of a second embodiment of the present invention.

A second embodiment of the invention is shown in FIGS. 12 and 13 and comprises a wire form structure which replaces the opposing undulation side walls 60 and 62 of the preferred embodiment shown in FIG. 7. In the instant embodiment, the serpentine channel is formed by two sets of wire rods $82_1$, $82_2$, $82_3$, $82_4$ and $84_1$, $84_2$, $84_3$ and $84_4$ wound about two sets of mutually offset wire rod post members $86_1$, $86_1$ and $90_1$ and $90_2$. As in the preferred embodiment, the two sets of wire rods $82_1$, $82_2$, etc. and $84_1$, $84_2$, etc. are mutually separated to provide linear path segments 94 and 96 which alternate in direction and accommodate two or more packages shown here as short neck bottles 38. Directly behind the two sets of wire rods is located a serpentine rear wall member 98 which spans the two sets of wire rods and provides a support surface for a serpentine guide bar member 100, which is adapted to contact the base or bottom surface 46 of the bottle package 38.

Further as shown in FIG. 13, the wire posts $88_2$ and $92_2$ around which the two sets of wire rods $82_1 \ldots 82_4$ and $84_1 \ldots 84_4$ are wound are skewed at an angle, such as 20 degrees, relative to the horizontal so that when a bottle package 38 is in place, it is angulated downwardly with its neck portion 38 protruding outwardly from the storage rack.

Thus what has been shown and described is an improved storage rack assembly including skewed serpentine shaped side members having a relatively small separation distance therebetween to provide a vertical storage column which can be utilized with both bottles and cans for various shapes without modification.

It should be further understood that many other variations of the storage and vend rack described herein may be made as would occur to one of ordinary skill in the art without departing from the general spirit and scope of the present invention.

What is claimed is:

1. A storage rack assembly in combination with a vending machine comprising;

a plurality of storage rack units juxtaposed between side walls of said vending machine, each said storage rack unit extending between a front wall and a back wall of said vending machine and including, (a) a plurality of side-by-side channel means for storing packages having substantially cylindrical sidewalls extending from a circular base, in a substantially vertical column and for guiding said packages in a serpentine path as the packages move from a top end of said column to a bottom end thereof; and (b) support means for positioning said packages within said channel means, said support means including serpentine side members having inwardly facing and mutually opposing sidewall surfaces defining said serpentine path wherein said inwardly facing sidewall surfaces are skewed at a predetermined angle relative to the horizontal and are tilted downwardly from the open front of said channel means to a rear wall thereof so that the longitudinal axis of each package is parallel to the front wall of the machine and skewed at an angle with respect to the horizontal plane and the package is supported only on said cylindrical sidewalls and said circular base;

each said storage rack unit being mounted on an independently movable pull-out slide assembly, each slide assembly being movable between positions within the vending machine and positions outboard thereof to facilitate loading of packages into said unit outboard of said machine from bottom to top of each channel means.

2. A storage rack in combination with a vending machine comprising:

channel means for storing packages having substantially cylindrical sidewalls extending from a circular base, said channel means being a substantially vertical column and guiding said packages in a serpentine path as the packages move from a top end of said column to the bottom end thereof;

and support means for defining said channel means and positioning said packages within said channel means so that the longitudinal axis of each package is skewed at an angle with respect to the horizontal plane wherein the package is supported only on said cylindrical sidewalls and said circular base, said support mean including a pair of mutually opposing serpentine side members having regularly undulating elongated sidewall surfaces with a predetermined separation therebetween and defining said serpentine path wherein said undulating elongated sidewall surfaces are skewed at a predetermined angle relative to the horizontal and are tilted downwardly from an open front of said channel means to a rear wall member thereof, the substantially vertical serpentine channel having a plurality of alternately directed path segments.

3. The storage rack according to claim 2 further including guide means comprising a serpentine guide member located intermediate said side members for supporting the circular base of said package in its skewed orientation.

4. The storage rack according to claim 1 and additionally including one or more of said channel means arranged side by side in substantially parallel relationship and integrated in a common storage rack body member.

5. The storage rack according to claim 4 wherein said common storage rack body member is mounted on a pull-out slide assembly and wherein a plurality of said pull-out slide assemblies are juxtaposed side-by-side between vertical walls of said vending machine, whereby each said slide assembly may be independently pulled to an outboard position of said vending machine for loading of said pckages in the respective channel means from bottom to top thereof.

6. The storage rack unit according to claim 1 wherein said side wall members comprise a plurality of wire rod members wound around a plurality of equally spaced and mutually offset support posts, said mutually offset support posts being skewed relative to the horizontal whereby a package is guided by is side and base portions rather than by its end portion or side portions only.

7. A storage rack in combination with a vending machine comprising:

channel means for storing packages with substantially cylindrical sidewalls extending from a circular base, said channel means having an open front face and including, a substantially vertical column defining a serpentine path from a top end of said column to the bottom end thereof;

support means for positioning said packages within said channel means, said support means including serpentine side members having inwardly facing sidewall surfaces defining said serpentine path, wherein said inwardly facing sidewall surfaces are skewed at a predetermined angle relative to the horizontal and are tilted downwardly from front to back;

a rear wall spanning said channel means;

a serpentine guide bar corresponding to said channel means and being formed intermediate said side members on said rear wall, whereby the circular base of said packages rests against said guide bar and the substantially cylindrical sidewalls rest against the skewed inwardly facing sidewall members; and a plurality of storage rack units juxtaposed between sidewalls of said vending machine, each said storage rack unit extending between a front wall and a back wall of said vending machine and including, a plurality of said channel means arranged side-by-side with the open front face of said channel means facing in a unitary direction and supporting said packages at an angle skewed with respect to the horizontal plane according to said support means;

each said storage rack unit being mounted on an independently movable pull-out slide assembly, each slid assembly being movable between positions within the vending machine and outboard thereof to facilitate loading of packages into said unit outboard of said machine from bottom to top of each said channel means.

* * * * *